United States Patent

Schneider et al.

[11] 3,843,714
[45] Oct. 22, 1974

[54] ESTERS OF 2-HALOGEN FLUORENE-9-CARBOXYLIC ACIDS

[75] Inventors: Gerhart Schneider; Sigmund Lust; Konrad Niethammer; Ernst Jacobi; Dietrich Erdmann; Günther Mohr, all of Darmstadt, Germany

[73] Assignee: Merck Patent Gesellschaft mit beschrankter Haftung, Darmstadt, Germany

[22] Filed: Aug. 4, 1971

[21] Appl. No.: 169,118

Related U.S. Application Data

[63] Continuation-in-part of Ser. No. 817,194, April 17, 1969, Pat. No. 3,598,564, Continuation-in-part of Ser. Nos. 326,186, Nov. 26, 1963, abandoned, and Ser. No. 310,118, Sept. 19, 1963, abandoned, and Ser. No. 736,954, June 14, 1968, Pat. No. 3,506,434, and Ser. No. 508,835, Nov. 19, 1965, Pat. No. 3,476,545.

[30] Foreign Application Priority Data

Dec. 1, 1962   Germany............................ 5497445

[52] U.S. Cl................................ 260/469, 260/473 F
[51] Int. Cl............................................ C07c 69/76
[58] Field of Search .......................... 260/469, 473 F

[56] References Cited
FOREIGN PATENTS OR APPLICATIONS
640,592   5/1964   Belgium............................. 260/469

OTHER PUBLICATIONS
Holbro et al., Helv. Chim. Acta, Vol. 33, pp. 2,177–2,185, (1950).
Sieglitz et al., Chem. Ber. Vol. 96, pp. 2,577–2,584, (1963).
Jones et al., J. Sci. Food Agric., Vol. 5, pp. 44–47, (1954).
Beilstein's Handbuch Der Organischer Chemie Band 10, 1st Series, pp. 354–355, (1927).
Chemisches Zentralblatt, 1942 I pp. 482–483.

Primary Examiner—Lorraine A. Weinberger
Assistant Examiner—Patrick J. Hagan
Attorney, Agent, or Firm—Millen, Raptes & White

[57] ABSTRACT

Compounds suitable for regulating plant growth are of the formula

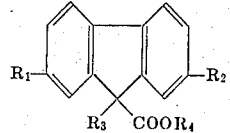

wherein
$R_1$ is halogen (chlorine, bromine, fluorine, iodine)
$R_2$ is selected from the group consisting of hydrogen and halogen
$R_3$ is hydrogen, hydroxy or chlorine
$R_4$ is an alkyl group of up to 8 carbon atoms.

8 Claims, No Drawings

ESTERS OF 2-HALOGEN FLUORENE-9-CARBOXYLIC ACIDS

CROSS-REFERENCE TO RELATED APPLICATIONS

This application is a continuation-in-part of copending application Ser. No. 817,194 filed Apr. 17, 1969, now U.S. Pat. No. 3,598,564, the contents of the latter application being incorporated by reference in the present application.

In addition, this application, by virtue of an unbroken chain of copendency with application Ser. No. 817,194, is also a continuation-in-part of applications Ser. No. 326,186 filed Nov. 26, 1963, and Ser. No. 310,118 filed Sept. 19, 1963, both now abandoned; Ser. No. 736,954 filed June 14, 1968, now U.S. Pat. No. 3,506,434 and Ser. No. 508,835 filed Nov. 19, 1965, now U.S. Pat. No. 3,476,545. The contents of all of these applications are incorporated by reference in the present application.

This invention relates to novel compounds suitable for the regulation of plant growth.

The principal object of this invention, therefore, is to provide novel compounds.

Upon further study of the specification and claims other objects and advantages of the present invention will become apparent.

To attain the objects of this invention, it has been discovered that fluorene-9-carboxylic acid derivatives of formula I

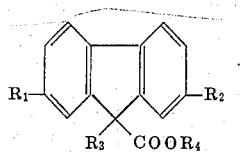

wherein
$R_1$ is halogen (chlorine, bromine, fluorine, iodine)
$R_2$ is selected from the group consisting of hydrogen and halogen
$R_3$ is hydrogen, hydroxy or chlorine
$R_4$ is an alkyl group of up to eight carbon atoms
exhibit an outstanding activity on plant growth by influencing plant development in an active state of growth of the plant. This influence probably takes place by an intervention in cell division and cell determination and thus shows its effects histologically, anatomically and morphologically.

The above-mentioned fluorene derivatives are highly active plant growth-regulating agents with a quite unprecedented breadth of activity. The compounds are absorbed by the plant, transported in it and apparently selectively enriched in meristematic tissue, especially in the vegetation points. Thus, they intervene to a previously unknown extent in the developmental processes of intact plants. They are characterized by an outstandingly low phytotoxicity and have a long lasting influence on tissue and organ formation and on any new-growth by disturbing the histological tissue topography and texture in the meristematic growing points. Because of this influence on cell division, cell determination, cell differentiation and tissue organization, particularly the new-growth of the plant after the treatment is affected. This fundamental influence on the growing plant is responsible for the exceptional variety of symptoms which the active compounds defined above exhibit when used in plants. Generally, inhibition of growth and development takes place, sometimes producing even organ regressions, organ metamorphoses, organ deficiencies and also new formations of organs.

Characteristic for the active compounds of this invention is their preferential intervention in meristematic tissues which are in an active state of division such as tissue of the main vegetation points or of the cambium. Meristematic tissues in a resting state or tissues and organs already fully differentiated at the time of treatment are scarcely influenced.

Besides this tissue-selective interaction, the compounds of the present invention differ considerably from the known growth regulators.

First of all, in general the compounds of this invention are phytotoxic — if at all — only to a remarkably slight extent, even at high concentrations up to 10,000 ppm, for example with respect to perennial grasses. Consequently, their plant growth regulating activity extends over an extremely wide range of concentration within which the active compounds display their activity with different strength and duration, in dependence of the dosage applied. In contrast, the known plant growth regulators such as phenoxy compounds or maleic hydrazide because of their relatively high phytotoxicity possess only a comparatively narrow concentration range and show at least herbicidal action at higher concentrations. In addition, known growth regulators cannot be used in many cases where an exact and sufficiently low application rate is not warranted in practical use. In comparison, the new compounds show a heretofore unknown favorable therapeutic index for modifying plant growth. Another important fact is the limited life-time of the novel compounds in the plant and in the soil which generally extends over some weeks only. In consequence, no problems arise from residuals, neither in the harvested products nor in the soil. This constitutes another important advantage with respect to known compounds such as halogenated benzoic acids or picolinic acid derivatives the practical usefulness of which is often restricted because of their long lasting persistence and residual problems. The superiority of the novel compounds in view of known growth regulators is further demonstrated by the fact that plants treated according to the invention in general retain their ability to return to normal new-growth and development. The period for which an inhibition or modification is desired may be regulated to a wide extent by the dosage choosen. High dosages effect strong and lasting growth inhibition or retardation whereas low dosages yield short-acting growth inductions, such as improvement of branching, or tillering, or rooting, rapidly followed by normal new-growth. This mild and controllable growth-regulating activity is an outstanding and unforeseeable feature of the compounds of this invention.

The active substances according to the invention display their action even in extreme dilutions, i.e., even at concentrations varying within a range of 0.01 to 100 ppm (parts per million), depending on the compound, the type of plant, the method of application and external influences. In this respect, the compounds of Formula I are even superior to the known fluorene-9-carboxylic acid derivatives.

The mode of action is completely systemic. The active materials penetrate for example into the seeds with the swelling water, but usually display a recognizable effect only in the germinating seedling or young plant. Applied to the growing plant, the substances are readily taken up via the leaves, other organs and through the roots and are transported and distributed in the plant acropetally as well as basipetally.

Consequently, the influence of the active compounds can be observed in very different parts of the plant, for instance in leaves, stems, roots, and sprouts. For example, in leaves and petals, a reduction of the leaf laminae is observed. Furthermore, reduction of the normal number of internodes and leaves up to complete blocking of any new-growth may occur. Increased and decreased formation of flower buds has been observed as well as premature or retarded development of flower buds or other organs, depending on the state of development at the time of application since fully developed tissue generally is not affected. Decisive is the state of development at the time of application.

A very important effect of the compounds according to this invention is the gradual diminuation or even elimination of the normal apical dominance in plants which offers manyfold practical implications. Upon application of the new compounds, the main stem of plants is gradually shortened and at the same time branching of stems is favored. Plant habit can be changed to a dwarfed, but bushy type of growth. This fundamental effect occurs in all groups of multicellular plant species, including monocotyledoneous crop plants (cereals, rice, corn, sugar cane, etc.) as well as turf and lawn grasses the tillering of which is of special interest. Increase in branching or tillering may be effected not only in annuals and perennials but also with woody plants and is of major interest in the wide-spread field of plant cultivation.

The new compounds also influence metabolism in plants giving rise, for instance, to increased chlorophyll formation or increase in plant constituents such as starch, sugars, and proteins.

Variations also occur in the roots. For example, an increased branching of the roots can be effected resulting in formation of more side roots of the first or second order, together with thickening of the roots, resulting in beet-like storage roots. Furthermore, enlargement and increase in number of the root hairs can be induced, as well as, in the case of cuttings, increased formation of adventitious roots.

Numerous other effects can also be achieved in plants by the action of the fluorene derivatives of this invention, e.g., parthenocarpic fruit formation (formation of seedless fruits without fructification) as well as interruption of the seed rest period of plant seeds with endogenic germination delay and induction of bud break or dormancy-depending on application time and dosage. The active compounds also can influence the water metabolism of the plants, e.g., the guttation of monocotyledon seedlings.

Although some fluorene-9-carboxylic acid derivatives have already been described to be of influence with respect to plant growth it could not be foreseen that the compounds of this invention are of such an outstanding and superior effectiveness as plant growth regulators. Thus, with respect to those compounds unsubstituted in 2- and/or 7-position, the halogenated compounds of this invention are manyfold more effective. It has furthermore been proved that the minimum concentration necessary to obtain a growth regulating effect is up to more than tenfold increased when comparing halogen substituted fluorene-9-carboxylic acid derivatives of this invention with the derivatives devoid of such a halo substituent.

Still more surprising is the fact that the esters of this invention are by far more effective as plant growth regulating agents than are the free acids although the prior art teaches for similar compounds that hydrolysis in vivo to the parent acid must be considered to be a possible complication. Thus it really is astonishing that the esters of Formula I are highly superior in activity even with respect to the 2-chloro-9-hydroxy-9-fluoroene-9-carboxylic acid which is described in the prior art to possess the strongest antigeotropic effect of a number of compounds of this series (Journal of the Science of Food and Agriculture, vol. 5, page 45 (1945)).

To demonstrate this superiority, the following test has been conducted:

Young seedlings of Galium aparine were treated in the early cotyledon stage. Each cotyledon received a droplet of exactly 0.02 ml (= 0.04 ml per plant) of a formulation of the respective active ingredient in various concentrations. 3 Tests with each 6 plants were carried out for each treatment and the values obtained were averaged. The formulations were prepared by dissolving the active compounds in small amounts of acetone and suspending this solution in demineralized water with addition of small amounts of a usual emulsifier ("Tween 20").

Evaluation took place 14 days after treatment. The growth regulating activity was determined by values ranging from 0 = no effect, through 1 = slight, 2 = strong, 3 = very strong effect. The following figures indicate the minimum concentrations in ppm which were necessary to obtain a strong effect (corresponding to value 2).

| active compound | minimum conc. ppm |
|---|---|
| 2-chloro-9-hydroxy-fluorene-9-carboxylic acid | 6.0 |
| methyl-2-chloro-9-hydroxy-fluorene-9-carboxylate | 0.1 |
| ethyl-2-chloro-9-hydroxy-fluorene-9-carboxylate | 0.2 |
| n-propyl-2-chloro-9-hydroxy-fluorene-9-carboxylate | 0.2 |
| isopropyl-2-chloro-9-hydroxy-fluorene-9-carboxylate | 0.2 |
| n-butyl-2-chloro-9-hydroxy-fluorene-9-carboxylate | 0.75 |
| iso-butyl-2-chloro-9-hydroxy-fluorene-9-carboxylate | 1.5 |
| n-butyl-2-bromo-9-hydroxy-fluorene-9-carboxylate | 1.5 |
| ethyl-2-iodo-9-hydroxy-fluorene-9-carboxylate | 1.5 |
| methyl-2-fluoro-9-hydroxy-fluorene-9-carboxylate | 1.5 |
| methyl-2-chloro-fluorene-9-carboxylate | 0.75 |

The fluorene carboxylic acids of Formula I are obtainable from known compounds by usual methods. Thus, the esters are available either by direct esterification of the corresponding acids by standard techniques or via the 9-chloro-fluorene-9-carboxylic acid chloride which can be converted into the desired ester by known methods followed by replacing the 9-chloro substituent if desired by an hydroxy group by treatment with silver hydroxide. It is further possible to introduce the halogen atoms in 2- and/or 7-position, especially the chloro substituents, directly by halogenation. In such cases, usually a mixture of the 2-substituted and 2,7-disubstituted derivatives is formed which for usual purposes of plant treatment according to this invention need not be separated. In general, such a mixture is used for the purposes of this invention in form of a 98 percent technical product containing, for instance, about 65 to 70 percent alkyl 2-chloro-9-hydroxy-fluoroene-9-carboxylate, 10 – 15 percent alkyl 2,7-dichloro-9-hydroxy-fluorene-9-carboxylate, and about 15 – 20 percent of the starting material, i.e., the corresponding alkyl 9-hydroxy-fluorene-9-carboxylate. Preferably, the methyl esters are prepared.

All substituted 9-hydroxy-fluorene-9-carboxylic acids to be used as starting materials are available from the correspondingly substituted phenanthrenenquinones by the well-known benzilic acid rearrangement.

Examples of individual effective compounds are the following:
methyl-2-chloro-9-hydroxy-fluorene-9-carboxylate
ethyl-2-chloro-9-hydroxy-fluorene-9-carboxylate
n-propyl-2-chloro-9-hydroxy-fluorene-9-carboxylate i-propyl-2-chloro-9-hydroxy-fluorene-9-carboxylate
n-butyl-2-chloro-9-hydroxy-fluorene-9-carboxylate
isobutyl-2-chloro-9-hydroxy-fluorene-9-carboxylate
n-heptyl-2-chloro-9-hydroxy-fluorene-9-carboxylate hexyl-2-chloro-9-hydroxy-fluorene-9-carboxylate
iso-octyl-2-chloro-9-hydroxy-fluorene-9-carboxylate methyl-2-bromo-9-hydroxy-fluorene-9-carboxylate
n-butyl-2-bromo-9-hydroxy-fluorene-9-carboxylate
methyl-2-iodo-9-hydroxy-fluorene-9-carboxylate
methyl-2-fluoro-9-hydroxy-fluorene-9-carboxylate
methyl-2,7-dichloro-9-hydroxy-fluorene-9-carboxylate
n-propyl-2,7-dichloro-9-hydroxy-fluorene-9-carboxylate
n-butyl-2,7-dichloro-9-hydroxy-fluorene-9-carboxylate
sec.butyl-2,7-dichloro-9-hydroxy-fluorene-9-carboxylate
iso-octyl-2,7-dichloro-9-hydroxy-fluorene-9-carboxylate
methyl-2,7-dibromo-9-hydroxy-fluorene-9-carboxylate
n-butyl-2,7-dibromo-9-hydroxy-fluorene-9-carboxylate
methyl-2-chloro-fluorene-9-carboxylate
isopropyl-2-chloro-fluorene-9-carboxylate
methyl-2,7,9-trichloro-fluorene9-carboxylate
methyl-2,9-dichloro-fluorene-9-carboxylate.

A preferred group of compounds are those wherein $R_2$ is hydrogen, $R_1$ is chlorine and $R_3$ is hydroxy. $R_4$ represents either a straight or branched chain alkyl group, e.g., methyl, ethyl, propyl, butyl, amyl, hexyl, heptyl, or octyl.

The compounds of this invention have been tested on numerous types of plants. For more details, reference is invited to the parent application, Ser. No. 817,194, filed Apr. 17, 1969, now U.S. Pat. No. 3,598,564.

The active substances according to this invention have been tested on numerous types of plants of most varied species, for example, tomatoes, pumpkins, cucumbers, beans, radishes, carrots, celery, lettuce, potatoes, sugar beets, cereals, maize, rice, cleavers, hemp-nettle, French weed, types of knot grass, charlock, white goose-foot, chickweed, autumn dandelion, field bindweed, dandelion, types of cocks foot, plantain species, colt's foot, small nettle, camomile, field ox-eye daisy, horse-thistle, as well as cotton, soy-bean, sugar cane, vines, fruit trees, grasses and ornamentals, e.g. cacti.

The new compounds show a broad spectrum of activities when applied to plants. They are generally used for a regulation and preferably retardation of plant growth.

The fluorene carboxylic acid derivatives are advantageously formulated as emulsion concentrates with a content of 5 to 95, preferably 50 percent by weight, of active material. Wettable powders or granulates are likewise suitable.

The application rate for use in fields ranges between 0.1 and 50 kg/ha. For all other purposes, application concentrations of from 0.01 to 10.000 ppm are suitable. For weed control in cereals, application rates of 0.1 to 5.0 kg/ha have been found to be most suitable whereas for general growth retardation rates of about 1.0 to 10.0 kg/ha are preferred.

With respect to the preparation of the active compounds, the following Examples are given for illustration.

EXAMPLE A a. 22,6 g 9-fluorenol-9-carboxylic acid are suspended in 150 ml water of 52°C. Within 2,5 hours, 7,1 g chlorine gas is introduced into this suspension with stirring. After one additional hour of stirring, the 2-chloro-9-hydroxy-fluorene-9-carboxylic acid is filtered, boiled with water and recrystallized from glacial acetic acid; m.p. 203°– 204°C.

b. 23,4 g 2-chloro-9-hydroxy-fluorene-9-carboxylic acid are dissolved in 100 ml n-propanol. After addition of 5 g 96 percent sulfuric acid, the mixture is refluxed for 4 hours. The excess of the alcohol is distilled off and the residue is poured into water. An oil precipitates which is taken up in dichloromethane. The solution is washed with sodium hydrogencarbonate solution and with water and dried over sodium sulfate. The solvent is removed and the residue is recrystallized from ethanol. The 2-chloro-9-hydroxy-fluorene-9-carboxylic acid n-propyl ester melts at 98° – 104°C.

Analogously, the following esters of 2-chloro-9-hydroxy-carboxylic acid are prepared:
methyl-2-chloro-9-hydroxy-fluorene-9-carboxylate, m.p. 152°C
ethyl-2-chloro-9-hydroxy-fluorene-9-carboxylate, m.p. 143°–147°C
n-butyl-2-chloro-9-hydroxy-fluorene-9-carboxylate, m.p. 74°–75°C i-butyl-2-chloro-9-hydroxy-fluorene-9-carboxylate, m.p.54°–58°C n-amyl-2-chloro-9-hydroxy-fluorene19-carboxylate, b.p. 163° – 165°/0.01mm Hg i-amyl-2-chloro-9-hydroxy-fluorene-9-carboxylate, b.p. 185°–187°/0.2mm Hg hexyl-2-chloro-9-hydroxy-fluorene-9-carboxylate, m.p. 78° – 79°C hepty-2-chloro-9-hydroxy-fluorene-9-carboxylate, oil (2-ethylhexyl)-2-chloro-9-hydroxy-fluorene19-carboxylate, b.p. 205° /0.25 mm Hg

EXAMPLE B a. 15 g of chlorine are introduced into a suspension of 22,6 g 9-fluorenol-9-carboxylic acid in 150 ml of water within 6 hours with stirring. By filtering, 24 g of 2,7-dichloro-9-hydroxy-fluorene-9-carboxylic acid having a melting point of 229°C are obtained.

b. 29,6 g of 2,7-dichloro-9-hydroxy-fluorene-9-carboxylic acid in 400 ml n-butanol are refluxed for 4 hours while passing dry hydrogen chloride through the mixture. The excess alcohol is removed under reduced pressure and the remaining residue is recrystallized from cyclohexane yielding n-butyl-2,7-dichloro-9-hydroxy-fluorene-9-carboxylate, m.p. 109°C.

By using the appropriate alcohols, the following esters are obtained in an analogous manner:

ethyl-2,7-dichloro-9-hydroxy-fluorene-9-carboxylate, m.p. 184° – 186°C n-propyl-2,7-dichloro-9-hydroxy-fluorene-9-carboxylate, m.p. 140° – 142°C i-propyl-2,7-dichloro-9-hydroxy-fluorene-9-carboxylate, m.p. 177° – 179°C i-butyl-2,7-dichloro-9-hydroxy-fluorene-9-carboxylate, m.p. 104° – 105°C n-amyl-2,7-dichloro-9-hydroxy-fluorene-9-carboxylate m.p. 91° – 93°C

EXAMPLE C 22,6 g 9-fluorenol-9-carboxylic acid is suspended in 300 ml water. 15 ml bromine are added and the mixture is stirred for 3 hours at 50°C. The crystals are filtered and recrystallized from galcial acetic acid. 27 g 2,7-dibromo-9-hydroxy-fluorene-9-carboxylic acid of m.p. 252° are thus obtained.

Analogously to Example A(b), the acid is transformed by reaction with n-butanol into n-butyl-2,7-dibromo-9-hydroxy-fluorene-9-carboxylate of m.p. 115.5°C.

EXAMPLE D

By reaction with thionyl chloride in dimethyl formamide, followed by treatment with n-butanol in analogy to Example A, (b), 2,7-dichloro-9-hydroxy-fluorene19-carboxylic acid is converted into n-butyl-2,7,9-trichloro-fluorene-9-carboxylate, m.p. 114.5°C.

Analogously, the following esters are prepared:
methyl ester: m. p. 193°C
ethyl ester: m. p. 141°C
n-propyl ester: m.p. 138°C
i-propyl ester: m.p. 161° – 162°C
i-butyl ester: m.p. 136°C

What is claimed is:

1. A fluorene-9-carboxylic acid compound of the formula

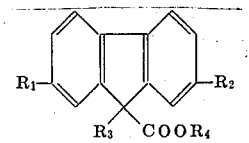

wherein
$R_1$ is chlorine
$R_2$ is hydrogen,
$R_3$ is hydroxy or chlorine
$R_4$ is an alkyl group of up to 8 carbon atoms.

2. A compound according to claim 1 wherein $R_3$ is hydroxy.

3. A compound according to claim 2 wherein $R_4$ is methyl.

4. A compound according to claim 2 wherein $R_4$ is ethyl.

5. A compound according to claim 2 wherein $R_4$ is n-butyl.

6. A compound according to claim 2 wherein $R_4$ is hexyl.

7. A compound according to claim 2 wherein $R_4$ is heptyl.

8. A compound as defined by claim 1 wherein $R_3$ is chlorine.

* * * * *